US012743346B2

(12) United States Patent
Fang

(10) Patent No.: US 12,743,346 B2
(45) Date of Patent: Sep. 22, 2026

(54) DATA STORAGE METHOD AND APPARATUS OF VIRTUAL MACHINE, VIRTUAL MACHINE, AND STORAGE MEDIUM

(71) Applicant: SUZHOU METABRAIN INTELLIGENT TECHNOLOGY CO., LTD., Suzhou (CN)

(72) Inventor: Hao Fang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 224 days.

(21) Appl. No.: 18/696,341

(22) PCT Filed: Nov. 29, 2022

(86) PCT No.: PCT/CN2022/135166
§ 371 (c)(1),
(2) Date: Mar. 27, 2024

(87) PCT Pub. No.: WO2023/147738
PCT Pub. Date: Aug. 10, 2023

(65) Prior Publication Data

US 2025/0045173 A1 Feb. 6, 2025

(30) Foreign Application Priority Data

Feb. 7, 2022 (CN) ......................... 202210115376.1

(51) Int. Cl.
*G06F 11/1446* (2026.01)
*G06F 11/14* (2026.01)

(52) U.S. Cl.
CPC ...... *G06F 11/1469* (2013.01); *G06F 11/1435* (2013.01); *G06F 11/1451* (2013.01)

(58) Field of Classification Search
CPC ............. G06F 11/1469; G06F 11/1435; G06F 11/1451
See application file for complete search history.

(56) References Cited

U.S. PATENT DOCUMENTS 7,415,488 B1 * 8/2008 Muth .................. G06F 11/2082 707/648
8,065,489 B1 * 11/2011 Cummings ........... G06F 16/176 711/161

(Continued)

FOREIGN PATENT DOCUMENTS

CN 102609365 A 7/2012
CN 102693230 A 9/2012

(Continued)

OTHER PUBLICATIONS

Corresponding International Patent Application No. PCT/CN2022/135166, International Search Report, Feb. 16, 2023.

(Continued)

*Primary Examiner* — Jigar P Patel
(74) *Attorney, Agent, or Firm* — Cooper Legal Group, LLC

(57) ABSTRACT

Disclosed are a data storage method and apparatus of a virtual machine, a virtual machine, and a storage medium. The method includes: acquiring a starting instruction of a virtual machine, and loading a storage device on the basis of the starting instruction; accessing metadata information recorded in first storage regions of at least two corresponding files in the storage device, and verifying the metadata information to obtain a verification result; when the verification result is normal, accessing data region bitmap information recorded in second storage regions of the at least two files; determining, on the basis of the data region bitmap information, data storage states of the at least two files; and (Continued)

when the data storage states of the at least two files are both normal, sending target data to the at least two files to perform data storage.

19 Claims, 4 Drawing Sheets

(56) References Cited

U.S. PATENT DOCUMENTS 8,694,714 B2 * 4/2014 Kern .................. G06F 12/0246 714/6.32
9,823,977 B2 * 11/2017 Dornemann .......... G06F 3/0619
11,526,403 B1 * 12/2022 Ruslyakov .......... G06F 11/2097
2018/0349233 A1 12/2018 Zaydman et al.
2022/0391094 A1 * 12/2022 Jain ...................... G06F 3/0604

FOREIGN PATENT DOCUMENTS

CN 103748545 A 4/2014
CN 104794028 A 7/2015
CN 109815207 A 5/2019
CN 111625401 A 9/2020
CN 111708603 A 9/2020
CN 112711498 A 4/2021
CN 113190177 A 7/2021
CN 114138566 A 3/2022
WO 2016191964 A1 12/2016

OTHER PUBLICATIONS

Corresponding International Patent Application No. PCT/CN2022/135166, Written Opinion, Date Mailed Feb. 16, 2023.

Corresponding Chinese Patent Application No. CN202210115376.1, First Office Action, dated Mar. 16, 2022.

Corresponding Chinese Patent Application No. CN202210115376.1, Notification to Grant, dated Apr. 7, 2022.

Zhao, Xun, et al., “Liquid: A Scalable Deduplication File System for Virtual Machine Images”, IEEE Transactions, May 31, 2014, pp. 1257-1266, vol. 25, Issue 5.

* cited by examiner

| New uuid | Bitmap uuid | Last uuid | History uuid |
|---|---|---|---|

DATA STORAGE METHOD AND APPARATUS OF VIRTUAL MACHINE, VIRTUAL MACHINE, AND STORAGE MEDIUM

CROSS-REFERENCE TO RELATED APPLICATION

This application is the national phase application of International Application No. PCT/CN2022/135166, filed Nov. 29, 2022, which claims priority to Chinese Patent Application No. 202210115376.1, entitled "DATA STORAGE METHOD AND APPARATUS OF VIRTUAL MACHINE, VIRTUAL MACHINE, AND STORAGE MEDIUM", filed with the China National Intellectual Property Administration on Feb. 7, 2022. The contents of International Application No. PCT/CN2022/135166 and Chinese Patent Application No. 202210115376.1 are incorporated herein by reference in their entireties.

FIELD

Embodiments of the present application relate to the field of data storage, and in particular, to a data storage method and apparatus of a virtual machine, a virtual machine, and a non-transitory computer-readable storage medium.

BACKGROUND

In the field of virtualization, a high-availability solution for virtual machines or virtual machines of cloud platforms is generally provided by a storage device. Technologies such as an active-active technology and a remote replication technology provided by the storage device are used to achieve an active-active function of a virtual machine application by triggering a disaster recovery function of storage.

However, the inventor realized that on a virtualization platform, a logical unit provided by the storage device is generally used to create a file system on a storage space of the logical unit to provide a storage space for the virtual machine. For the disaster recovery on the virtualization platform, the storage device needs to be first used to recover data on the logical unit; the file system is then recovered; files in the file system are recovered; and finally, the system of the virtual machine is recovered. An IO stack for the entire data recovery is very long. Any failure occurring in the data recovery at any level might lead to data loss in the virtual machine. Therefore, how to improve the disaster recovery efficiency on the virtualization platform and ensure the high availability of the virtual machine has become an urgent problem to be solved.

SUMMARY

Embodiments of the present application provide a data storage method of a virtual machine, including:

- acquiring a starting instruction of a virtual machine, and loading a storage device on the basis of the starting instruction;
- accessing metadata information recorded in first storage regions of at least two corresponding files in the storage device, and verifying the metadata information to obtain a verification result;
- in response to the verification result being normal, accessing data region bitmap information recorded in second storage regions of the at least two files;
- determining, on the basis of the data region bitmap information, data storage states of the at least two files; and
- in response to the data storage states of the at least two files being both normal, sending target data to the at least two files to perform data storage.

In some embodiments, the method further includes:

- accessing first identifier information of third storage regions of the at least two files;
- in response to the first identifier information being consistent, determining that data stored in the at least two files is consistent; and
- in response to the first identifier information being inconsistent, determining that data stored in the at least two files is inconsistent, and performing data synchronization on the data stored in the at least two files.

In some embodiments, the method further includes:

- in response to the virtual machine being run abnormally, controlling data in the second storage regions of the at least two files to be consistent and controlling data in the third storage regions of the at least two files to be consistent; and
- in response to one of the at least two files being abnormal, recording information of the abnormal file in the first storage region of the normal file.

In some embodiments, the method further includes:

- comparing the metadata information recorded in the first storage regions of the at least two files; and
- in response to the metadata information being consistent, determining that the verification result is normal, or in response to the metadata information being inconsistent, determining that the verification result is abnormal.

In some embodiments, the method further includes:

- generating at least two pieces of corresponding second identifier information on the basis of the data region bitmap information recorded in the second storage regions of the at least two files;
- comparing the at least two pieces of second identifier information; and
- in response to the at least two pieces of second identifier information being consistent, determining that the data storage states of the at least two files are normal, or in response to the at least two pieces of second identifier information being inconsistent, determining that the data storage states of the at least two files are abnormal.

In some embodiments, the method further includes:

- in the process of sending target data to the at least two files to perform data storage, in response to existence of any abnormal file, continuing to send the target data to the abnormal file; and
- in response to the number of times of sending the target data to the abnormal file being greater than or equal to a threshold of number of times and the abnormal file not performing the data storage successfully, determining that a data storage path of the abnormal file is abnormal.

In some embodiments, the method further includes:

- in response to determining that the data storage path of the abnormal file is abnormal, sending the target data to the normal file to enable the normal file to continue to perform data storage on the target data;
- detecting a data storage state of the abnormal file in real time, and in response to detecting that the data storage state of the abnormal file is normal, performing data synchronization on the abnormal file on the basis of the data stored in the normal file; and in response to the data synchronization being completed, executing the step of sending target data to the at least two files to perform data storage.

A second aspect of the present application provides a data storage apparatus of a virtual machine, including:

an acquisition module, configured for: acquiring a starting instruction of a virtual machine, and loading a storage device on the basis of the starting instruction;

an accessing module, configured for: accessing metadata information recorded in first storage regions of at least two corresponding files in the storage device, and verifying the metadata information to obtain a verification result, wherein the accessing module is further configured for: when the verification result is normal, accessing data region bitmap information recorded in second storage regions of the at least two files;

a determining module, configured for determining, on the basis of the data region bitmap information, data storage states of the at least two files; and a sending module, configured for: when the data storage states of the at least two files are both normal, sending target data to the at least two files to perform data storage.

A third aspect of the present application provides a virtual machine, including: one or more processors and one or more memories, wherein the one or more processors are configured for executing computer-readable instructions of the virtual machine stored in the one or more memories to implement the data storage method of the virtual machine described in the first aspect.

A fourth aspect of the present application provides a non-transitory computer-readable storage medium, wherein the non-transitory computer-readable storage medium stores computer-readable instructions; and the computer-readable instructions are able to be executed by the one or more processors to implement the data storage method of the virtual machine described in the first aspect.

DETAILED DESCRIPTION

In order to make the objectives, technical solutions, and advantages of the embodiments of the present application clearer, the technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

For the convenience of understanding the embodiments of the present application, a further explanation will be made with specific embodiments in conjunction with the accompanying drawings. The embodiments do not constitute a limitation on the embodiments of the present application.

Figures 1, 2:
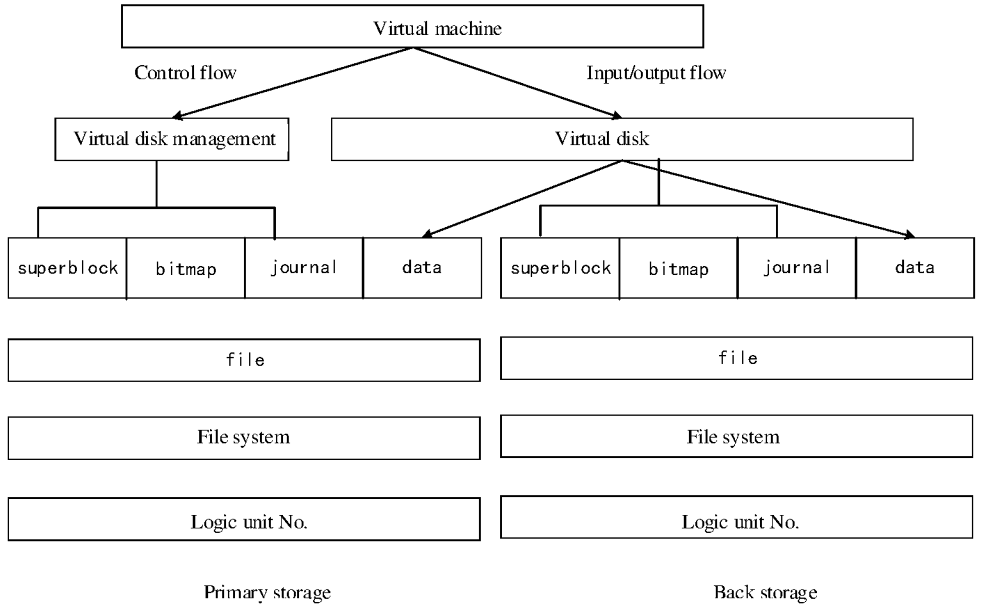
FIG. 1 is a structural diagram of a layout of a virtual disk according to one or more embodiments of the present application.
FIG. 2 is a structural diagram of data storage in a third storage region according to one or more embodiments of the present application.

FIG. 1 is a structural diagram of a layout of a virtual disk according to an embodiment of the present application. As shown in FIG. 1, a virtual machine, a virtual disk management module, and a virtual disk are included. The virtual disk management module is configured for performing a data storage method of a virtual machine. This embodiment of the present application takes two files as an example. First, a layout structure of the virtual disk needs to be designed. File systems are created separately in storage spaces on two logical units provided by a storage device, and then files are created separately in the two file systems to provide a storage space for the virtual machine. The two files are formatted into a plurality of regions. This embodiment of the present application takes four regions as an example, including a first storage region, a second storage region, a third storage region, and a fourth storage region. The first storage region might be a superblock region, which mainly records metadata information such as a size of the virtual disk and names of primary and backup files. The second storage region might be a bitmap region, which records data region bitmap information, and each bit represents a segment of data region. The data region might be 4 KB by default in the present application; a data space of 8 K is reserved by default; and two bitmap data regions are saved. The third storage region might a journal region that records data updated at each time. The fourth storage region might be a data region that stores real data of the virtual machine.

FIG. 2 is a structural diagram of data storage in a third storage region according to an embodiment of the present application. As shown in FIG. 2, the third storage region is a journal region, and a data storage mode might be divided into four regions to record historical information of metadata changes, namely: New uuid, Bitmap uuid, Last uuid, and History uuid. The New uuid is uuid information generated when current latest metadata changes; the Bitmap uuid is uuid information generated by bitmap of the current data region; the Last uuid is uuid information generated when last metadata changes; and the History uuid is uuid information generated when last two pieces of metadata change. The uuid information is identifier information generated when data changes, which may further include information such as time when data changes.

Figure 3:
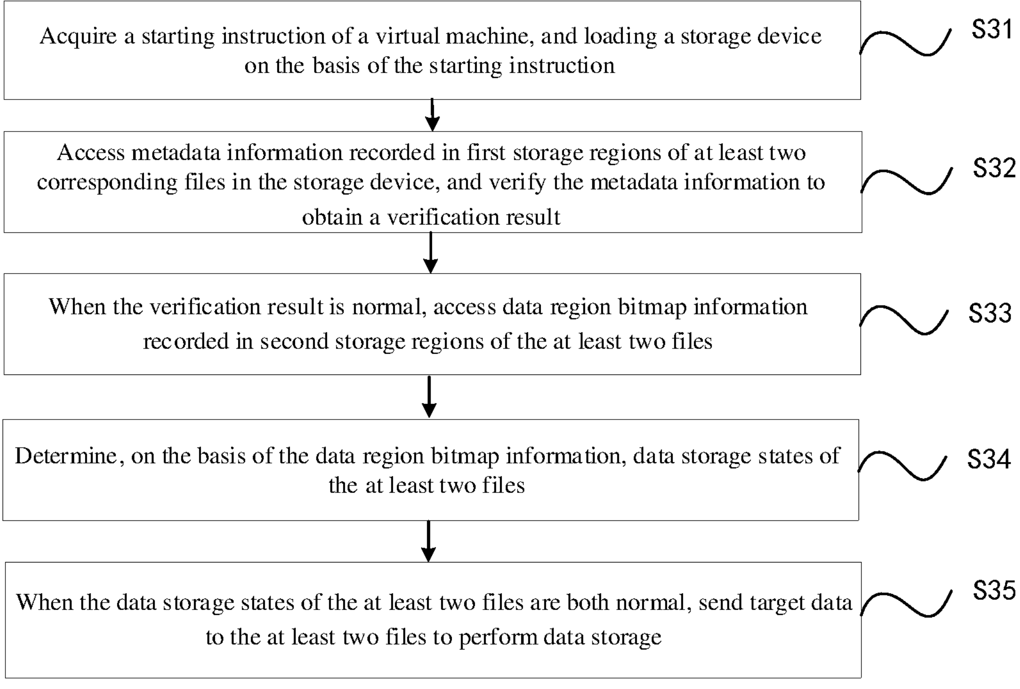
FIG. 3 is a flowchart of a data storage method of a virtual machine according to one or more embodiments of the present application.

FIG. 3 is a flowchart of a data storage method of a virtual machine according to an embodiment of the present application. As shown in FIG. 3, the method includes:

S31. A starting instruction of a virtual machine is acquired, and a storage device is loaded on the basis of the starting instruction.

In this embodiment of the present application, the starting instruction of the virtual machine is first acquired. After receiving the starting instruction, the virtual machine loads the storage device. The storage device in this embodiment of the present application may be a disk.

S32. Metadata information recorded in first storage regions of at least two corresponding files in the storage device is accessed, and the metadata information is verified to obtain a verification result.

The at least two files created in the corresponding two file systems in the storage device are accessed. This embodiment of the present application is illustrated by two files. The two files might be used as primary and backup files. First storage regions corresponding to the two files are accessed. The first storage regions might be superblock regions. Since the superblock regions mainly record the size of the virtual disk, the names of the primary and backup files, and other metadata information, the above metadata information might be expressed as uuid identifiers. If the uuid identifiers recorded in the two files are the same, it might be determined that the verification result is normal, indicating that the two files belong to the same group of primary and backup files. Correspondingly, if the uuid identifiers recorded in two files are different, it might be determined that the verification result is abnormal, indicating that the two files do not belong to the same group of primary and backup files.

S33. If the verification result is normal, data region bitmap information recorded in second storage regions of the at least two files is accessed.

S34. Data storage states of the at least two files are determined on the basis of the data region bitmap information.

S33 to S34 are uniformly described below:

When it is determined that two files belong to the same group of primary and backup files, second storage regions of the two files are separately read. The second storage regions might be bitmap regions. Meanwhile, corresponding uuid identifiers might also be generated according to the data region bitmap information recorded in the bitmap regions. Then, the bitmap uuid identifiers of the two files in the third storage regions (journal regions) are read, and whether the bitmap uuid identifiers of the two files are consistent is compared. If the identifiers are consistent, it is determined that the data storage states of the two files are normal, and data storage might be normally performed. If the identifiers are inconsistent, it is determined that the data storage states of the two files are abnormal, and data storage might not be performed.

S35. If the data storage states of the at least two files are both normal, target data is sent to the at least two files to perform data storage.

In this embodiment of the present application, when it is determined that the data storage states of the two files are both normal, the target data might be sent to the two files respectively to perform data storage.

According to the data storage method of the virtual machine according to this embodiment of the present application, a starting instruction of a virtual machine is acquired, and a storage device is loaded on the basis of the starting instruction; metadata information recorded in first storage regions of at least two corresponding files in the storage device is accessed, and the metadata information is verified to obtain a verification result; if the verification result is normal, data region bitmap information recorded in second storage regions of the at least two files is accessed; data storage states of the at least two files are determined on the basis of the data region bitmap information; and if the data storage states of the at least two files are both normal, target data is sent to the at least two files to perform data storage. In the existing technology, a logical unit provided by the storage device is used; a file system is created on a storage space of the logical unit to provide a storage space for the virtual machine; for the disaster recovery on a virtualization platform, the storage device needs to be first used to recover data on the logical unit, the file system is then recovered, files in the file system are recovered, and finally, the system of the virtual machine is recovered, so that an IO stack for the entire data recovery is very long, and any failure occurring in the data recovery at any level might lead to data loss in the virtual machine. By this method, the data storage way in which the above at least two files are mutual backups might improve the disaster recovery efficiency on the virtualization platform and ensure high availability of the virtual machine might be ensured.

Figure 4:
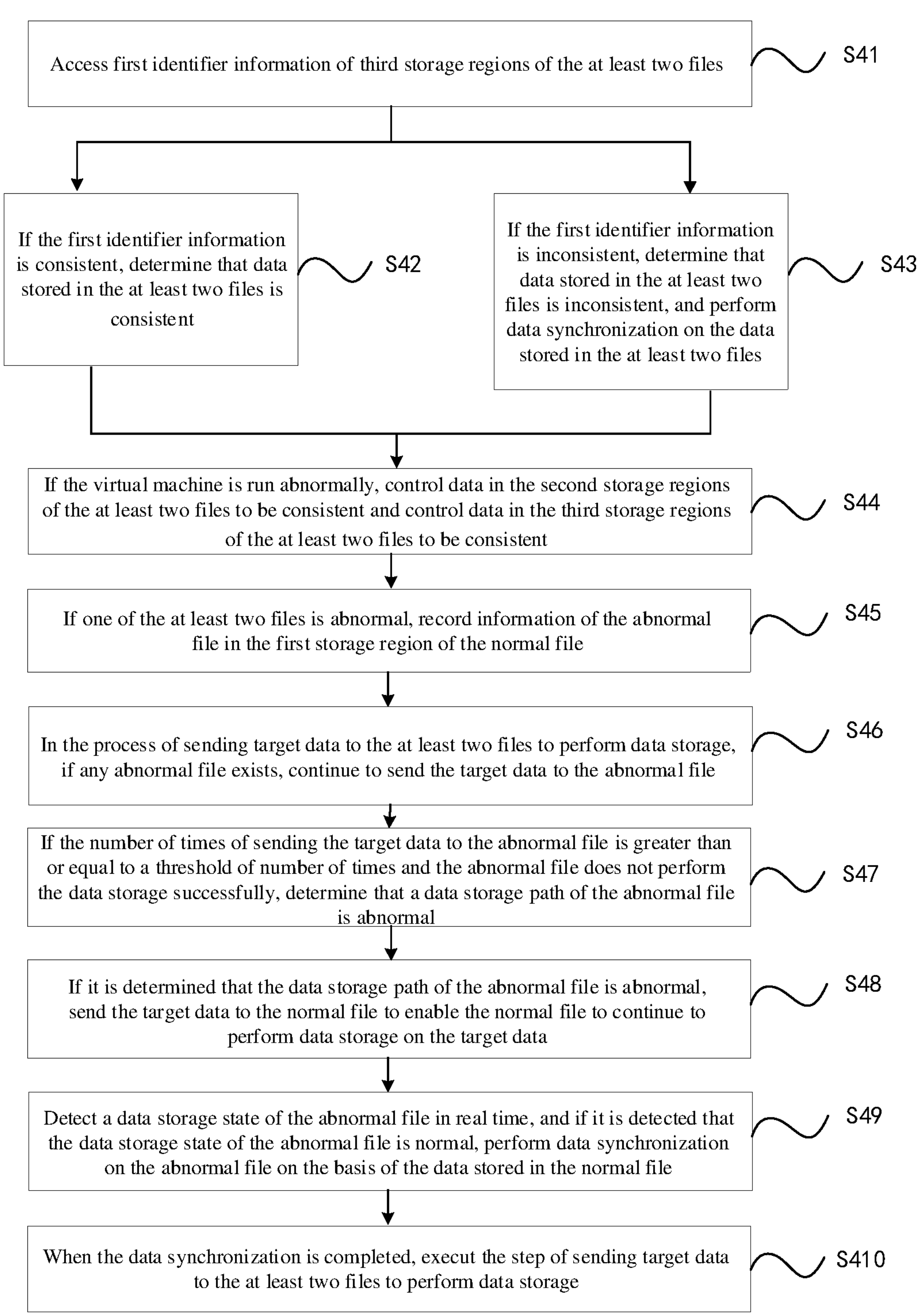
FIG. 4 is a flowchart of another data storage method of a virtual machine according to one or more embodiments of the present application.

FIG. 4 is a flowchart of another data storage method of a virtual machine according to an embodiment of the present application. As shown in FIG. 4, the method includes:

S41. First identifier information of third storage regions of the at least two files are accessed.

In this embodiment of the present application, data synchronization might be performed on the two files before the data storage, and the first identifier information of the third storage regions of the two files might be accessed. The first identifier information might be New uuid, Bitmap uuid, Last uuid, or History uuid identifiers.

S42. If the first identifier information is consistent, it is determined that data stored in the at least two files is consistent.

If the first identifier information corresponding to the two files is consistent, that is, if the New uuid of the primary file is consistent with the New uuid of the backup file, the Bitmap uuid of the primary file is consistent with the Bitmap uuid of the backup file, the Last uuid of the primary file is consistent with the Last uuid of the backup file, and the History uuid of the primary file is consistent with the History uuid of the backup file, it is determined that the data stored in the two files is consistent, data synchronization is not required.

S43. If the first identifier information is inconsistent, it is determined that data stored in the at least two files is inconsistent, and data synchronization is performed on the data stored in the at least two files.

If the New uuid of the two files is empty, it indicates that the two files are newly created files, with no data changes, and might be loaded into a progress of the virtual machine process. If the New uuid of the two files is consistent, it is confirmed that the data of the two files is consistent, and data synchronization is not required.

In some embodiments, if the New uuid of one of the files is consistent with the Last uuid or the History uuid in the other file, it indicates that the data of the file is old, and the data of the other file needs to be fully synchronized to the file.

In some embodiments, if the New uuid of one of the files is inconsistent with the Last uuid or the History uuid in the other file, it is determined that the data in the two files is inconsistent, and the loading of the storage device fails, so that related data needs to manually verified and synchronized. This issue may occur in the data storage process. One of the files is abnormal and will no longer receive data, while the other normal file continues to perform data storage. After a certain period of time, there is a significant difference in the data of the two files. As a result, the New uuid of one file is inconsistent with the Last uuid or History uuid of the other file. It is necessary to wait for manual verification and synchronization of the relevant data.

S44. If the virtual machine is run abnormally, data in the second storage regions of the at least two files is controlled to be consistent and data in the third storage regions of the at least two files is controlled to be consistent.

In this embodiment of the present application, there may also be such a situation that a device except the virtual machine is shut down or halted in the data storage process. When the virtual machine is run abnormally, the second storage regions of the two files are accessed, and a file with the latest data is determined on the basis of the identifier information of the second storage regions; and the data in the file with the latest data is synchronized to the other file. Correspondingly, the third storage regions of the two files are accessed. As the third storage regions record data updated at each time, it ensures that the data records in the third storage regions of the two files are consistent, and might reflect that the data of the two files are consistent when the virtual machine is run abnormally.

S45. If one of the at least two files is abnormal, information of the abnormal file is recorded in the first storage region of the normal file.

If one of the two files is abnormal when the virtual machine is run abnormally, the first storage region of the normal file records file information of the abnormal file, and the abnormal file is marked as Not Available.

S46. In the process of sending target data to the at least two files to perform data storage, if any abnormal file exists, the target data is continued to be sent to the abnormal file.

In this embodiment of the present application, in the data storage process, one of the files may be abnormal due to the network or other reasons, and the target data might not be sent to the abnormal file normally to perform data storage. At this time, the target data is continued to be sent to the abnormal file.

S47. If the number of times of sending the target data to the abnormal file is greater than or equal to a threshold of number of times and the abnormal file does not perform the data storage successfully, it is determined that a data storage path of the abnormal file is abnormal.

If the number of times of sending the target data to the abnormal file is greater than or equal to the threshold of number of times (for example, five) and the abnormal file still does not perform the data storage successfully, it is determined that the data storage path of the abnormal file is abnormal.

S48. If it is determined that the data storage path of the abnormal file is abnormal, the target data is sent to the normal file to enable the normal file to continue to perform data storage on the target data.

When it is determined that the data storage path of the abnormal file is abnormal, the virtual machine continues to undertake services and continues to send the target data to the normal file to enable the normal file to continue to perform data storage on the target data, which ensures the normal service of the virtual machine.

S49. A data storage state of the abnormal file is detected in real time, and if it is detected that the data storage state of the abnormal file is normal, data synchronization is performed on the abnormal file on the basis of the data stored in the normal file.

The data storage state of the abnormal file is detected in real time. After the abnormal file is recovered, it might be detected that the data storage state of the abnormal file is normal. The data is synchronized to the abnormal file on the basis of the data stored in the normal file. A data synchronization direction might be determined according to the uuid in the third storage regions.

S410. When the data synchronization is completed, the step of sending target data to the at least two files to perform data storage is executed.

In this embodiment of the present application, in the data synchronization process, the normal file still receives the target data to perform data storage to ensure the service of the virtual machine. In this case, the data synchronization amount might be controlled to be greater than the data storage amount of the normal file. After a certain period of time, the data synchronization of the two files might be completed. When the data synchronization is completed, the target data might be continued to be sent to the two files simultaneously, so that the two files might perform data storage.

According to the data storage method of the virtual machine according to this embodiment of the present application, a starting instruction of a virtual machine is acquired, and a storage device is loaded on the basis of the starting instruction; metadata information recorded in first storage regions of at least two corresponding files in the storage device is accessed, and the metadata information is verified to obtain a verification result; if the verification result is normal, data region bitmap information recorded in second storage regions of the at least two files is accessed; data storage states of the at least two files are determined on the basis of the data region bitmap information; and if the data storage states of the at least two files are both normal, target data is sent to the at least two files to perform data storage. By this method, the data storage way in which the above at least two files are mutual backups might improve the disaster recovery efficiency on the virtualization platform and ensure high availability of the virtual machine.

Figure 5:
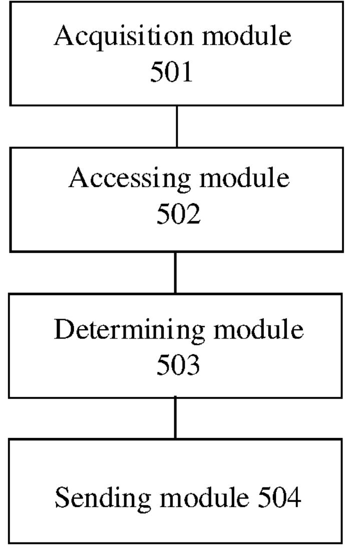
FIG. 5 is a schematic structural diagram of a data storage apparatus of a virtual machine according to one or more embodiments of the present application.

FIG. 5 is a schematic structural diagram of a data storage apparatus of a virtual machine according to an embodiment of the present application. The apparatus includes:

- an acquisition module 501, configured for: acquiring a starting instruction of a virtual machine, and loading a storage device on the basis of the starting instruction;
- an accessing module 502, configured for: accessing metadata information recorded in first storage regions of at least two corresponding files in the storage device, and verifying the metadata information to obtain a verification result;
- wherein the accessing module 502 is further configured for: when the verification result is normal, accessing data region bitmap information recorded in second storage regions of the at least two files;
- a determining module 503, configured for determining, on the basis of the data region bitmap information, data storage states of the at least two files; and
- a sending module 504, configured for: when the data storage states of the at least two files are both normal, sending target data to the at least two files to perform data storage.

In some embodiments, the accessing module 502 is configured for accessing first identifier information of third storage regions of the at least two files.

In some embodiments, the determining module 503 is configured for: if the first identifier information is consistent, determining that data stored in the at least two files is consistent, and if the first identifier information is inconsistent, determining that data stored in the at least two files is inconsistent, and performing data synchronization on the data stored in the at least two files.

In some embodiments, the determining module 503 is further configured for: comparing the metadata information recorded in the first storage regions of the at least two files; and if the metadata information is consistent, determining that the verification result is normal, and if the metadata information is inconsistent, determining that the verification result is abnormal.

In some embodiments, the determining module 503 is further configured for: generating at least two pieces of corresponding second identifier information on the basis of the data region bitmap information recorded in the second storage regions of the at least two files; comparing the at least two pieces of second identifier information; if the at least two pieces of second identifier information are consistent, determining that the data storage states of the at least two files are normal; and if the at least two pieces of second identifier information are inconsistent, determining that the data storage states of the at least two files are abnormal.

In some embodiments, the sending module 504 is configured for: in the process of sending target data to the at least two files to perform data storage, if any abnormal file exists, continuing to send the target data to the abnormal file; and if the number of times of sending the target data to the abnormal file is greater than or equal to a threshold of number of times and the abnormal file does not perform the data storage successfully, determining that a data storage path of the abnormal file is abnormal.

In some embodiments, the sending module 504 is configured for: when it is determined that the data storage path of the abnormal file is abnormal, sending the target data to the normal file to enable the normal file to continue to perform data storage on the target data; detecting a data storage state of the abnormal file in real time, and if it is detected that the data storage state of the abnormal file is normal, performing data synchronization on the abnormal file on the basis of the data stored in the normal file; and when the data synchronization is completed, executing the step of sending target data to the at least two files to perform data storage.

In some embodiments, the sending module 504 is configured for: when the virtual machine is run abnormally, controlling data in the second storage regions of the at least two files to be consistent and controlling data in the third storage regions of the at least two files to be consistent; and if one of the at least two files is abnormal, recording information of the abnormal file in the first storage region of the normal file.

The data storage apparatus of the virtual machine provided in this embodiment might be the data storage apparatus of the virtual machine shown in FIG. 5, which might execute all the steps of the data storage method of the virtual machine shown in FIG. 3 to FIG. 4, thereby achieving the technical effect of the data storage method of the virtual machine shown in FIG. 3 to FIG. 4. Refer to the relevant descriptions in FIG. 3 to FIG. 4 for details. For concise descriptions, the apparatus will not be elaborated here.

Figure 6:
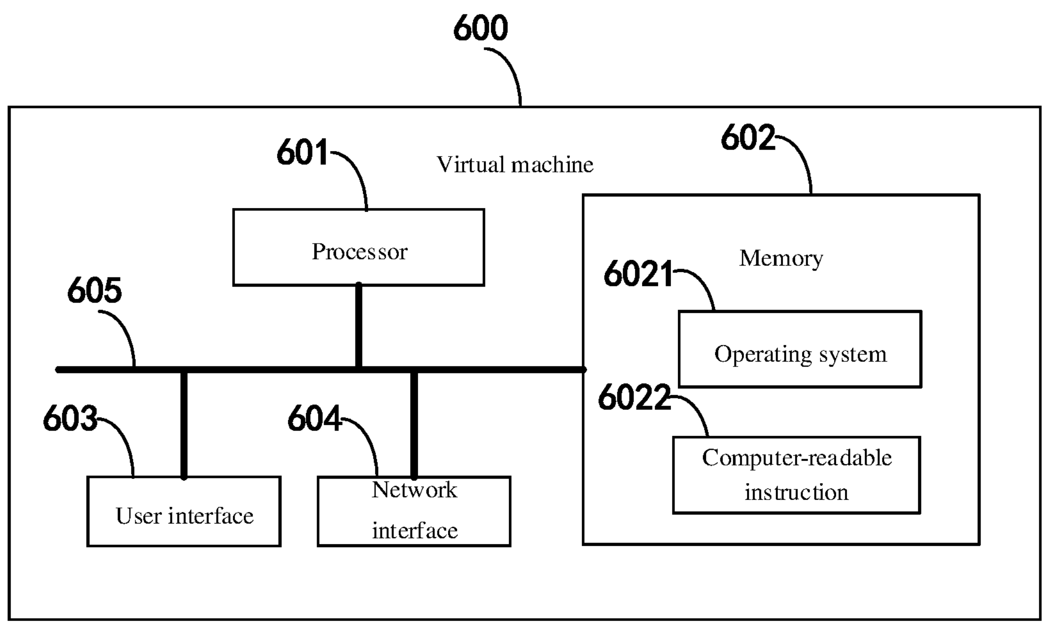
FIG. 6 is a schematic structural diagram of a virtual machine according to one or more embodiments of the present application.

FIG. 6 is a schematic structural diagram of a virtual machine according to an embodiment of the present application The virtual machine 600 shown in FIG. 6 includes: at least one processor 601, a memory 602, at least one network interface 604, and another user interface 603. The various components in the virtual machine 600 are coupled together by using a bus system 605. It might be understood that the bus system 605 is configured for implementing connection and communication between these components. In addition to a data bus, the bus system 605 further includes a power bus, a control bus, and a state signal bus. But, for ease of clear description, all types of buses in FIG. 6 are marked as the bus system 605.

The user interface 603 might include a display, a keyboard or a click device (for example, a mouse, a trackball, a touch panel, or a touch screen).

It might be understood that the memory 602 in this embodiment of the present application may be a volatile memory or a non-transitory memory, or may include both a volatile memory and a non-transitory memory. The non-transitory memory may be a Read-Only Memory (ROM), a programmable ROM (PROM), an erasable PROM (EPROM), an electrically EPROM (EEPROM), or a flash memory. The volatile memory may be a Random Access Memory (RAM) serving as an external cache. Through illustrative but not limited descriptions, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synch link DRAM (SLDRAM), and a direct Rambus RAM (DRRAM), are available. The memory 602 described herein aims to include these and any other suitable types of memories.

In some implementations, the memory 602 stores the following elements: executable units or data structures, or their subsets, or their extension sets: an operating system 6021 and computer-readable instructions 6022.

The operating system 6021 includes computer-readable instructions of various systems, for example, a framework layer, a core library layer, a drive layer, and the like, to implement various basic services and process hardware-based tasks. The computer-readable instructions 6022 include various computer-readable instructions, such as a media player and a browser, which are configured for implementing various application services. The computer-readable instructions for implementing the method of this embodiment of the present application may be included in the application computer-readable instructions 6022.

In this embodiment of the present application, by calling the computer-readable instructions stored in the memory 602, which may be the computer-readable instructions stored in the computer-readable instructions 6022, the processor 601 is configured for executing the steps of the method provided in the various method embodiments, for example, including:

- acquiring a starting instruction of a virtual machine, and loading a storage device on the basis of the starting instruction; accessing metadata information recorded in first storage regions of at least two corresponding files in the storage device, and verifying the metadata information to obtain a verification result; when the verification result is normal, accessing data region bitmap information recorded in second storage regions of the at least two files; determining, on the basis of the data region bitmap information, data storage states of the at least two files; and when the data storage states of the at least two files are both normal, sending target data to the at least two files to perform data storage.

In some embodiments, first identifier information in third storage regions of the at least two files is accessed; if the first identifier information is consistent, it is determined that data stored in the at least two files is consistent; and if the first identifier information is inconsistent, it is determined that data stored in the at least two files is inconsistent, and data synchronization is performed on the data stored in the at least two files.

In some embodiments, when the virtual machine is run abnormally, data in the second storage regions of the at least two files is controlled to be consistent and data in the third storage regions of the at least two files is controlled to be consistent; and if one of the at least two files is abnormal, information of the abnormal file is recorded in the first storage region of the normal file.

In some embodiments, the metadata information recorded in the first storage regions of the at least two files is compared; and if the metadata information is consistent, it is determined that the verification result is normal; and if the metadata information is inconsistent, it is determined that the verification result is abnormal.

In some embodiments, at least two pieces of corresponding second identifier information are generated on the basis of the data region bitmap information recorded in the second storage regions of the at least two files; the at least two pieces of second identifier information are compared; and if the at least two pieces of second identifier information are consistent, it is determined that the data storage states of the at least two files are normal; and if the at least two pieces of second identifier information are inconsistent, it is determined that the data storage states of the at least two files are abnormal.

In some embodiments, in the process of sending target data to the at least two files to perform data storage, if any abnormal file exists, the target data is continued to be sent to the abnormal file; and if the number of times of sending the target data to the abnormal file is greater than or equal to a threshold of number of times and the abnormal file does not perform the data storage successfully, it is determined that a data storage path of the abnormal file is abnormal.

In some embodiments, when it is determined that the data storage path of the abnormal file is abnormal, the target data is sent to the normal file to enable the normal file to continue to perform data storage on the target data; a data storage state of the abnormal file is detected in real time, and if it is detected that the data storage state of the abnormal file is normal, data synchronization is performed on the abnormal file on the basis of the data stored in the normal file; and when the data synchronization is completed, the step of sending target data to the at least two files to perform data storage is executed.

The above method disclosed in the embodiments of the present application might be applied to the processor 601, or implemented by the processor 601. The processor 601 may be an integrated circuit chip, which has a signal processing capability. In an implementation process, all the steps of the above method might be completed through an integrated logic circuit of hardware in the processor 601 or instructions in the form of software. The above-mentioned processor 601 might be a general-purpose processor, a Digital Signal Processor (DSP), an Application Specific Integrated Circuit (ASIC), a Field Programmable Gate Array (FPGA), or other programmable logic devices, discrete gates or transistor logic devices, or discrete hardware components, and may implement or perform the methods, steps, and logic block diagrams that are disclosed in the embodiments of this application. The general-purpose processor may be a microprocessor, or the processor may be any conventional processor, or the like. The steps of the methods disclosed in the embodiments of the present application might be directly performed and completed by a hardware decoding processor or performed and completed by combining hardware and software units in a decoding processor. The software unit may be located in a storage medium that is mature in the art, such as a RAM, a flash memory, a ROM, a PROM, an electrically erasable programmable memory, and a register. The storage medium is located in the memory 602. The processor 601 reads information in the memory 602 and completes the steps of the above method in combination with the hardware of the processor.

It might be understood that these embodiments described herein might be implemented using hardware, software, firmware, middleware, microcode, or a combination thereof. For hardware-based implementation, a processing unit might be implemented in one or more Application Specific Integrated Circuits (ASICs), a Digital Signal Processing (DSP), a Digital Signal Processing Device (DSPD), a Programmable Logic Device (PLD), a Field Programmable Gate Array (FPGA), a general-purpose processor, a controller, a microcontroller, a microprocessor, and other electronic units or combinations thereof configured for performing the functions of the present application.

For software-based implementation, the technology described herein might be implemented through the units that perform the functions herein. The software codes might be stored in the memory and executed by the processor. The memory might be implemented inside or outside the processor.

The data storage apparatus of the virtual machine provided in this embodiment might be the virtual machine as shown in FIG. 6, which might execute all the steps of the data storage method of the virtual machine shown in FIG. 3 to FIG. 4, thereby achieving the technical effect of the data storage method of the virtual machine shown in FIG. 3 to FIG. 4. Refer to the relevant descriptions in FIG. 3 to FIG. 4 for details. For concise descriptions, the apparatus will not be elaborated here.

This embodiment of the present application further provides a non-transitory computer-readable storage medium. The non-transitory computer-readable storage medium stores one or more computer-readable instructions. The non-transitory computer-readable storage medium may include a volatile memory, such as a RAM. The memory might also include a non-transitory memory, such as a ROM, a flash memory, a hard disk drive, or a solid-state disk drive. The memory might also include a combination of the aforementioned types of memories.

When one or more computer-readable instructions in a non-transitory computer-readable storage medium might be executed by one or more processors to achieve the data storage method of the virtual machine executed on the virtual machine side.

The processor is configured for executing the computer-readable instructions of the virtual machine stored in the memory to implement the steps, executed on the virtual machine side, of the data storage method of the virtual machine:

acquiring a starting instruction of a virtual machine, and loading a storage device on the basis of the starting instruction; accessing metadata information recorded in first storage regions of at least two corresponding files in the storage device, and verifying the metadata information to obtain a verification result; when the verification result is normal, accessing data region bitmap information recorded in second storage regions of the at least two files; determining, on the basis of the data region bitmap information, data storage states of the at least two files; and when the data storage states of the at least two files are both normal, sending target data to the at least two files to perform data storage.

In some embodiments, first identifier information in third storage regions of the at least two files is accessed; if the first identifier information is consistent, it is determined that data stored in the at least two files is consistent; and if the first identifier information is inconsistent, it is determined that data stored in the at least two files is inconsistent, and data synchronization is performed on the data stored in the at least two files.

In some embodiments, when the virtual machine is run abnormally, data in the second storage regions of the at least two files is controlled to be consistent and data in the third storage regions of the at least two files is controlled to be consistent; and if one of the at least two files is abnormal, information of the abnormal file is recorded in the first storage region of the normal file.

In some embodiments, the metadata information recorded in the first storage regions of the at least two files is compared; and if the metadata information is consistent, it is determined that the verification result is normal; and if the metadata information is inconsistent, it is determined that the verification result is abnormal.

In some embodiments, at least two pieces of corresponding second identifier information are generated on the basis of the data region bitmap information recorded in the second storage regions of the at least two files; the at least two pieces of second identifier information are compared; and if the at least two pieces of second identifier information are consistent, it is determined that the data storage states of the at least two files are normal; and if the at least two pieces of second identifier information are inconsistent, it is determined that the data storage states of the at least two files are abnormal.

In some embodiments, in the process of sending target data to the at least two files to perform data storage, if any abnormal file exists, the target data is continued to be sent to the abnormal file; and if the number of times of sending the target data to the abnormal file is greater than or equal to a threshold of number of times and the abnormal file does not perform the data storage successfully, it is determined that a data storage path of the abnormal file is abnormal.

In some embodiments, when it is determined that the data storage path of the abnormal file is abnormal, the target data is sent to the normal file to enable the normal file to continue to perform data storage on the target data; a data storage state of the abnormal file is detected in real time, and if it is detected that the data storage state of the abnormal file is normal, data synchronization is performed on the abnormal file on the basis of the data stored in the normal file; and when the data synchronization is completed, the step of sending target data to the at least two files to perform data storage is executed.

A person skilled in the art may further realize that units and algorithm steps of all the examples described in the foregoing embodiments disclosed herein may be implemented by electronic hardware, computer software, or a combination thereof. To clearly describe the interchangeability between the hardware and the software, the foregoing has generally described compositions and steps of each example based on functions. Whether these functions are implemented as hardware or software depends on particular application and design constraint conditions of the technical solutions. A person skilled in the art may use different methods to implement the described functions for each particular application, but it should not be considered that the implementation goes beyond the scope of the present application.

The steps of the method or algorithm described in conjunction with the embodiments disclosed herein might be implemented using hardware, software modules executed by the processor, or a combination thereof. The software modules might be placed in a RAM, an internal memory, a ROM, an EPROM, EEPROM, a register, a hard disk drive, a removable disk, a CD-ROM, or a storage medium in any other form known in the technical field.

The specific implementations mentioned above provide further detailed explanations of the objectives, technical solutions, and beneficial effects of the present application. It should be understood that the above descriptions are merely specific implementations of the present application and are not intended to limit the protection scope of the present application. Any modifications, equivalent replacements, improvements, and the like made within the spirit and principle of the present application should all fall within the protection scope of the present application.

What is claimed is:

1. A data storage method of a virtual machine, comprising:

acquiring a starting instruction of the virtual machine, and loading a storage device according to the starting instruction;

accessing metadata information recorded in first storage regions of at least two corresponding files in the storage device, and verifying the metadata information to obtain a verification result;

in response to the verification result being normal, accessing data region bitmap information recorded in second storage regions of the at least two corresponding files;

determining, according to the data region bitmap information, data storage states of the at least two corresponding files;

in response to the data storage states of the at least two corresponding files being both normal, sending target data to the at least two corresponding files to perform data storage;

during the sending target data to the at least two corresponding files to perform data storage, in response to existence of an abnormal file in the at least two corresponding files, continuing to send the target data to the abnormal file; and in response to a number of times of sending the target data to the abnormal file being greater than or equal to a threshold of number of times and the abnormal file not performing the data storage successfully, determining that a data storage path of the abnormal file is abnormal.

2. The method according to claim 1, wherein the method further comprises:

accessing first identifier information of third storage regions of the at least two corresponding files; and in response to the first identifier information being consistent, determining that data stored in the at least two corresponding files is consistent, and in response to the first identifier information being inconsistent, determining that the data stored in the at least two corresponding files is inconsistent, and performing data synchronization on the data stored in the at least two corresponding files.

3. The method according to claim 1, wherein the method further comprises:

in response to the virtual machine being run abnormally, controlling data in the second storage regions of the at least two corresponding files to be consistent and controlling data in third storage regions of the at least two corresponding files to be consistent; and in response to one of the at least two corresponding files being abnormal, recording information of the- abnormal file of the at least two corresponding files in a first storage region of a normal file of the at least two corresponding files.

4. The method according to claim 1, wherein the accessing metadata information recorded in first storage regions of at least two corresponding files in the storage device, and verifying the metadata information to obtain a verification result comprises:

comparing the metadata information recorded in the first storage regions of the at least two corresponding files; and in response to the metadata information being consistent, determining that the verification result is normal, and in response to the metadata information being inconsistent, determining that the verification result is abnormal.

5. The method according to claim 4, wherein the determining, according to the data region bitmap information, data storage states of the at least two corresponding files comprises:

generating at least two pieces of corresponding second identifier information according to the data region bitmap information recorded in the second storage regions of the at least two corresponding files;

comparing the at least two pieces of corresponding second identifier information; and in response to the at least two pieces of corresponding second identifier information being consistent, determining that the data storage states of the at least two corresponding files are normal, and in response to the at least two pieces of corresponding second identifier information being inconsistent, determining that the data storage states of the at least two corresponding files are abnormal.

6. The method according to claim 1, further comprising:

in response to determining that the data storage path of the abnormal file is abnormal, sending the target data to a normal file to enable the normal file to continue to perform data storage on the target data;

detecting a data storage state of the abnormal file in real time, and in response to detecting that the data storage state of the abnormal file is normal, performing data synchronization on the abnormal file according to data stored in the normal file; and in response to the data synchronization being completed, executing the step of sending target data to the at least two corresponding files to perform data storage.

7. The method according to claim 2, wherein each of the at least two corresponding files comprises one of the first storage regions, one of the second storage regions, one of the third storage regions, and a fourth storage region; each of the third storage regions stores a record of data updated at each time; and the fourth storage region stores real data of the virtual machine.

8. The method according to claim 2, wherein the third storage regions comprise New unique identifier code (uuid), Bitmap uuid, Last uuid, and History uuid;

the New uuid is uuid information generated when current latest metadata changes;

the Bitmap uuid is uuid information generated by bitmap of a current third storage region;

the Last uuid is uuid information generated when last metadata changes; and the History uuid is uuid information generated when last two pieces of metadata change.

9. The method according to claim 4, wherein the at least two corresponding files are primary and backup files for each other.

10. The method according to claim 9, wherein the method further comprises:

determining whether the at least two corresponding files belong to a same group of primary and backup files;

in response to the verification result being normal, determining that the at least two corresponding files belong to the same group of primary and backup files; and in response to the verification result being abnormal, determining that the at least two corresponding files do not belong to the same group of primary and backup files.

11. The method according to claim 3, wherein in a data storage process, a situation in which the virtual machine is run abnormally comprises a device, except the virtual machine, being shut down or halted.

12. The method according to claim 8, wherein the method further comprises:

in response to the New uuid of the at least two corresponding files being empty, loading the at least two corresponding files to a virtual machine progress.

13. The method according to claim 8, wherein the method further comprises:

in response to the New uuid of a first file of the at least two corresponding files being consistent with the Last uuid or the History uuid in a second file of the at least two corresponding files, synchronizing data of the second file to the first file.

14. The method according to claim 8, wherein the method further comprises:

in response to the New uuid of a first file of the at least two corresponding files being inconsistent with the Last uuid or the History uuid in a second file of the at least two corresponding files, manually verifying and synchronizing related data.

15. The method according to claim 6, wherein during the data synchronization, the method further comprises:

determining a data synchronization direction according to first identifier information of third storage regions.

16. The method according to claim 6, wherein during the data synchronization, the method further comprises:

controlling a data synchronization amount to be greater than a data storage amount of the normal file.

17. The method according to claim 9, wherein the metadata information comprises a size of a virtual disk and names of the primary and backup files.

18. A virtual machine, comprising: one or more processors and one or more memories, wherein the one or more processors are configured for executing computer-readable instructions of the virtual machine stored in the one or more memories, and upon execution of the computer-readable instructions, the one or more processors are configured for:

acquiring a starting instruction of the virtual machine, and loading a storage device according to the starting instruction;

accessing metadata information recorded in first storage regions of at least two corresponding files in the storage device, and verifying the metadata information to obtain a verification result;

in response to the verification result being normal, accessing data region bitmap information recorded in second storage regions of the at least two corresponding files;

determining, according to the data region bitmap information, data storage states of the at least two corresponding files;

in response to the data storage states of the at least two corresponding files being both normal, sending target data to the at least two corresponding files to perform data storage;

during the sending target data to the at least two corresponding files to perform data storage, in response to existence of an abnormal file in the at least two corresponding files, continuing to send the target data to the abnormal file; and in response to a number of times of sending the target data to the abnormal file being greater than or equal to a threshold of number of times and the abnormal file not performing the data storage successfully, determining that a data storage path of the abnormal file is abnormal.

19. A non-transitory computer-readable storage medium storing computer-readable instructions that are executed by a processor, and upon execution by the processor, are configured for:

acquiring a starting instruction of a virtual machine, and loading a storage device according to the starting instruction;

accessing metadata information recorded in first storage regions of at least two corresponding files in the storage device, and verifying the metadata information to obtain a verification result;

in response to the verification result being normal, accessing data region bitmap information recorded in second storage regions of the at least two corresponding files;

determining, according to the data region bitmap information, data storage states of the at least two corresponding files; and in response to the data storage states of the at least two corresponding files being both normal, sending target data to the at least two corresponding files to perform data storage;

during the sending target data to the at least two corresponding files to perform data storage, in response to existence of an abnormal file in the at least two corresponding files, continuing to send the target data to the abnormal file; and in response to a number of times of sending the target data to the abnormal file being greater than or equal to a threshold of number of times and the abnormal file not performing the data storage successfully, determining that a data storage path of the abnormal file is abnormal.

* * * * *